M. Reeder,
Beer Pump.
No 26,930.    Patented Jan. 24, 1860.

Witnesses.
Henry Howson
Horace See

Inventor.
Mahlon Reeder

UNITED STATES PATENT OFFICE.

MAHLON REEDER, OF PHILADELPHIA, PENNSYLVANIA.

APPARATUS FOR PRESERVING AND DISCHARGING MALT LIQUORS.

Specification of Letters Patent No. 26,930, dated January 24, 1860.

*To all whom it may concern:*

Be it known that I, MAHLON REEDER, of the city and county of Philadelphia and State of Pennsylvania, have invented a new and improved Apparatus for Preserving and Discharging Malt Liquors; and I do hereby declare the following to be a full, clear, and exact description of the same, reference being had to the accompanying drawing and to the letters of reference marked thereon.

My invention consists in the application, for preserving and discharging malt liquors, of a vessel furnished with a suitable cock or cocks and a tightly packed piston operated substantially as described hereafter, so that the malt liquor may be retained within the vessel, free from contact with the air at all times, and so that it may be discharged from the vessel in small quantities, and in that fresh and brisk condition which malt liquor loses when drawn from open vessels or from barrels to which the air has access through the vent peg or bung hole.

In order to enable others to make and use my invention, I will now proceed to describe its construction and mode of operation.

Figure 1:
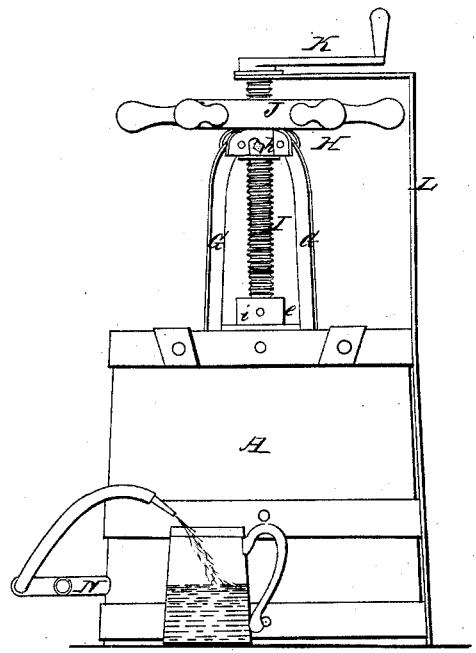
Figure 2:
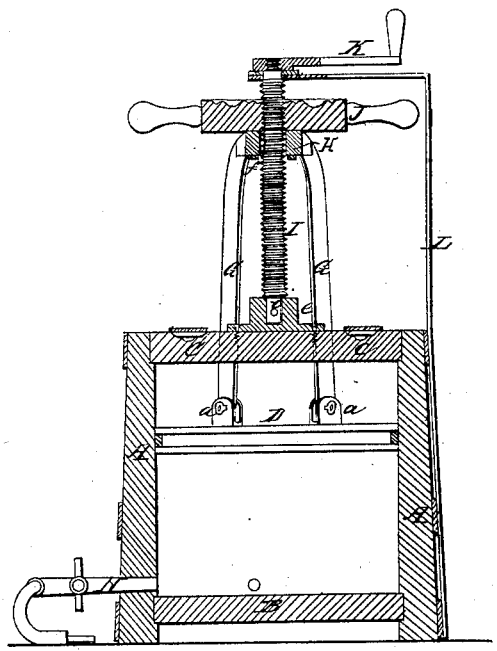
Figure 3:
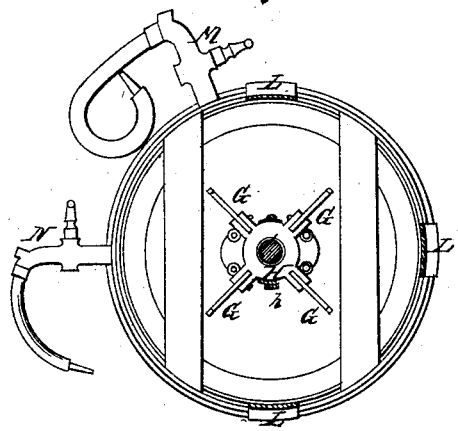

On reference to the accompanying drawing which forms a part of this specification, Figure 1, is an exterior view; Fig. 2, a vertical section, and Fig. 3, a plan of my improved apparatus for preserving and discharging malt liquors.

Similar letters refer to similar parts throughout the several views.

A is a hollow cylindrical vessel closed below by the permanent bottom B and above by the detachable cover C.

D is a packed piston, and to lugs *a a* attached to this piston, at equal distances from its center, are jointed the rods G, one rod to each lug. These rods pass through the slots in the cover C, at a suitable distance above which they are connected to a central hub H. Through the latter as well as through a hand wheel J, passes the screw I the lower end of which is adapted to a socket *e* on the top of the cover C, the upper end, which is furnished with an ordinary crank handle K being arranged to turn in a bracket L which is attached to the vessel. Near to the bottom of the vessel are attached any convenient number of ordinary cocks M N, furnished with elastic pipes which terminate in suitable nozzles; through these pipes the malt liquor is admitted to and discharged from the vessel.

It will be observed that the threads of the screw I are adapted to threads in the wheel J but that the screw passes freely through the central hub H. Underneath the latter however is a plate F so hung to the hub and so regulated by a screw *h* that the said plate may be moved in and out of gear with the threads of the screw. A pin *i* passes through the socket *e* as well as through the end of the screw I, the pin being readily detached and replaced, so that when detached the screw may turn freely in the socket, and when in its place the screw may become stationary with the socket.

Operation: When the vessel has to be furnished with a supply of malt liquor, the catch plate F is thrown into gear with the screw I, and the pin *i* removed from the socket *e*. One of the pipes connected to the cocks M or N is then inserted into the vat containing the liquor and the handle K with the screw I is turned. The hub H being through the catch plate F, in gear with the threads of the screw, or in other words, forming the nut of the screw, will ascend, and through the rods G G, will raise the piston D (which had been previously depressed) within the vessel, causing the liquor in the vat to flow through the pipe into the space between the piston and bottom of the vessel. The cock is now closed, the catch plate F thrown out of gear with the screw and the pin *i* re-inserted into the hub *e* and end of the screw.

The liquor in the vessel being free from exposure to the air retains all the freshness it possessed when contained in the vat. When a small quantity of liquor has to be drawn from the vessel one of the cocks M or N is opened and a slight turn given to the wheel J by one of its handles. This turning of the wheel on the stationary screw depresses the hub H, rods G G, and piston D, and the latter bearing on the surface of the liquor in the vessel, discharges from the same a quantity depending upon the extent to which the piston is depressed. The proper quantity of liquor having been obtained, the cock is closed until another supply is required.

It will be seen without further description that the liquor contained in the vessel is at all times free from exposure to the air, and that it can be discharged in small quantities and furnished to the consumer in that fresh and brisk condition which it loses when drawn from open vessels or from barrels to which air must necessarily have access, either through the bung or vent peg hole.

I do not desire to confine myself to the precise devices herein described for operating the piston; but I claim and desire to secure by Letters Patent—

The application for preserving and discharging malt liquors, of a vessel furnished with a suitable cock or cocks and a tightly packed piston operated substantially as described for the purpose specified.

In testimony whereof, I have signed my name to this specification before two subscribing witnesses.

MAHLON REEDER.

Witnesses:
  HENRY HOWSON,
  CHARLES D. FREEMAN.